United States Patent [19]
Stokes
[11] Patent Number: 4,559,464
[45] Date of Patent: Dec. 17, 1985

[54] MOLDED COMMUTATOR AND METHOD OF MANUFACTURE

[75] Inventor: Vijay K. Stokes, Schenectady, N.Y.
[73] Assignee: General Electric Company, Schenectady, N.Y.

[21] Appl. No.: 507,877
[22] Filed: Jun. 27, 1983
[51] Int. Cl.⁴ ............................................ H02K 13/00
[52] U.S. Cl. ...................................... 310/233; 310/43; 29/597
[58] Field of Search ................................ 310/233-237, 310/43, 219, 232; 29/597; 174/138 R

[56] References Cited

U.S. PATENT DOCUMENTS

| | | | |
|---|---|---|---|
| 537,480 | 4/1895 | Painter | 310/236 |
| 854,781 | 5/1907 | Underwood | 310/236 |
| 2,473,248 | 12/1944 | Hausheer | 310/236 |
| 2,519,217 | 8/1950 | Atwell | 310/236 |
| 2,602,988 | 7/1952 | Klym | 29/190 |
| 3,079,520 | 2/1963 | Schafer | 310/235 |
| 3,102,965 | 9/1963 | Ickes | 310/235 |
| 3,161,947 | 12/1964 | Schafer | 310/235 |
| 3,182,217 | 5/1965 | Quinn | 310/235 |
| 3,251,120 | 5/1966 | Reisnecker | 29/155.54 |
| 3,608,350 | 9/1971 | Yamaguchi | 72/358 |
| 3,864,821 | 2/1975 | Ito et al. | 29/597 |
| 3,958,326 | 5/1976 | Matsumoto et al. | 29/597 |
| 3,987,539 | 10/1976 | Gravener | 29/597 |
| 4,071,796 | 1/1978 | Nippert | 310/236 |
| 4,247,795 | 1/1981 | Stafford | 310/233 |
| 4,385,253 | 5/1983 | Gruenwald | 310/235 |
| 4,456,846 | 6/1984 | Stokes | 310/235 |

FOREIGN PATENT DOCUMENTS

| | | | |
|---|---|---|---|
| 0138455 | 10/1979 | Fed. Rep. of Germany | 310/233 |
| 2458157 | 12/1980 | France . | |
| 2504318 | 10/1982 | France | 310/233 |
| 0129552 | 10/1981 | Japan | 29/597 |
| 665116 | 1/1952 | United Kingdom | 29/597 |
| 0409326 | 4/1974 | U.S.S.R. | 310/236 |

*Primary Examiner*—R. Skudy
*Attorney, Agent, or Firm*—William H. Steinberg; James C. Davis, Jr.; Marvin Snyder

[57] ABSTRACT

A molded commutator has conductive segments circumferentially arranged about a central axis so that their outer surfaces form an overall structure of cylindrical shape as the outer surface of the commutator. Inside of this structure is an annular core to which each commutator segment is anchored by a tang formed on the inner surface of each segment, which is mechanically interlocked with a pair of tangs on the core. The tangs are shaped and configured such that, after assembly, each segment tang is interlocked between the core tangs in a dove-tail-like relationship. A nonconductive matrix is molded between the segments and the core. A method of making the commutator is to form an annular segment pack containing the conductive segments, with each segment having a segment tang formed on its inner surface, and an annular core having the core tang for one axial end of the commutator formed on its outer surface. The segment pack is then fitted over the outside of the core such that each of the core tangs is in interlocking engagement with one end of one of the segment tangs. The core tangs for the other axial end of the commutator are then mounted on the core such that each of them is in interlocking engagement with the other axial end of one of the segment tangs. To complete the structure, a nonconductive matrix is molded between the segment pack and the core.

3 Claims, 12 Drawing Figures

MOLDED COMMUTATOR AND METHOD OF MANUFACTURE

BACKGROUND OF THE INVENTION

This invention relates to molded commutators for rotating electrical machinery. More particularly, it relates to a molded commutator having improved means for anchoring the commutator segments and to a method for fabricating such commutators.

Conventional commutators comprise a plurality of contact segments arranged in an overall cylindrical or annular shape, each segment separated by an insulated gap. The fabrication of commutators by means of a molding process has provided a relatively efficient and economical way of producing such commutators. For small, low speed commutators, where the centrifugal forces experienced by the contact segments in operation are not large enough to cause the commutator to break apart during use, conventional molded commutators are highly reliable. However, as the operative size or speed of rotation of the commutator increases, the centrifugal forces on the contact segments increase rapidly, the forces being roughly proportional to $N^2R^2$ where N is the rotational speed of the commutator and R is the radius of the commutator. Thus, for some values of $N^2R^2$, the centrifugal force on the commutator segments becomes greater than the strength of the plastic matrix used for molding, and such molded commutators cannot be used. It is known to provide claws, tangs, or similar protuberances on the interior surfaces of the conducting segments of such molded commutators in order to prevent the loosening and loss of the segments during rotation. A commutator typifying the prior art is disclosed in U.S. Pat. No. 3,987,539 issued to Gravener on Oct. 26, 1976. For such commutators, the contact segments are typically anchored by tangs embedded in the molded matrix. While such means of anchoring the segments are quite satisfactory for small commutators, they are not adequate for relatively larger ones, because the centrifugal force on the contact segments for larger commutators exceeds the mechanical strength of the molded matrix used to anchor the segments. To provide the strength required for large values of $N^2R^2$, the large, high speed commutators currently available all employ a metal cap and cone design. Such designs are heavy and relatively expensive. Furthermore, the manufacture of metal cap and cone commutators is labor intensive and not easily automated, and therefore relatively expensive. Molded commutators, on the other hand, can be manufactured by processes which are less labor intensive and easily automated.

It is an object of the present invention to provide a new and improved commutator structure which provides an effective anchoring means suitable for large commutators.

It is a further object of the present invention to provide a commutator structure having sufficient strength for use in applications requiring large commutator diameters.

It is also an object of the present invention to provide a commutator structure which can be economically produced with existing technology.

It is still another object of the present invention to provide a method for manufacturing large commutators which is not labor intensive and can be easily automated.

SUMMARY OF THE INVENTION

In one aspect of the present invention, a commutator for rotating electrical machinery comprises a plurality of conductive segments having inner and outer surfaces. The segments are circumferentially arranged in a spaced-apart relationship about an axis so that their outer surfaces form an overall structure of cylindrical shape as the outer surface of the commutator. Inside of this structure is located an annular core which provides added strength to the commutator by serving as an anchor for the commutator segments. After assembly, each of the commutator segments is anchored to this core by means of a tang located on the inner surface of each segment, which is mechanically interlocked with a pair of tangs on the core. A nonconductive matrix is molded within the structure between the segments and the core.

In another aspect of the present invention, a method for making a molded commutator for rotating electrical machinery is set forth in which an annular segment pack is formed having a plurality of conductive segments with inner and outer surfaces, the segments being circumferentially arranged in a spaced-apart relationship about an axis so that their outer surfaces form an overall structure of cylindrical shape as the outer surface of the commutator, and so that each of the segments has a tang located at its inner radius for anchoring the segment against centrifugal disassembly. In the method set forth, an annular core is also formed having a plurality of core tangs circumferentially located on its outer surface for the purpose of interlocking engagement with the tangs on the conductive segments. During assembly the annular segment pack is fitted over the annular core such that the core tangs are in interlocking engagement with the segment tangs. A second set of core tangs is mounted on the core to complete the interlocking arrangement and a nonconductive matrix is molded between the segment pack and the core to insulate the segments from the core.

BRIEF DESCRIPTION OF THE DRAWINGS

The subject matter which is regarded as the invention is particularly pointed out and distinctly claimed in the concluding portion of the specification. The invention itself, however, both as to its organization and method of practice, together with further objects and advantages thereof, may best be understood by reference to the following description taken in conjunction with the accompanying drawings, in which:

DETAILED DESCRIPTION OF THE DRAWINGS

Figure 1:
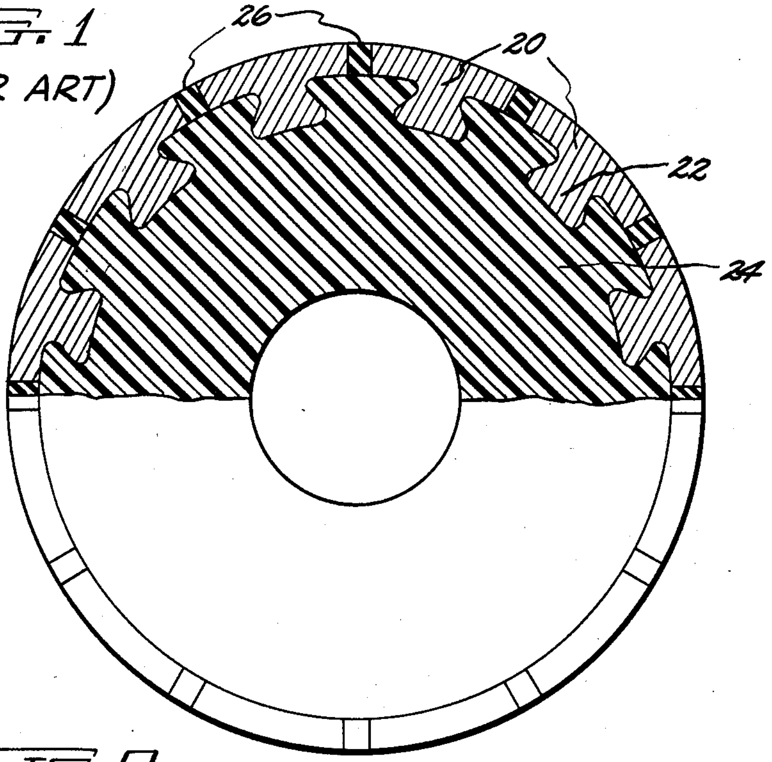
FIG. 1 (PRIOR ART)
FIG. 1 is an end view in partial cross section of a conventional molded commutator.

A partial cross sectional view of a conventional molded commutator is illustrated in FIG. 1. Each contact segment 20 has an anchoring tang 22 embedded in molded matrix 24. Separating each pair of segments 20 is an insulating gap 26.

Figure 2:
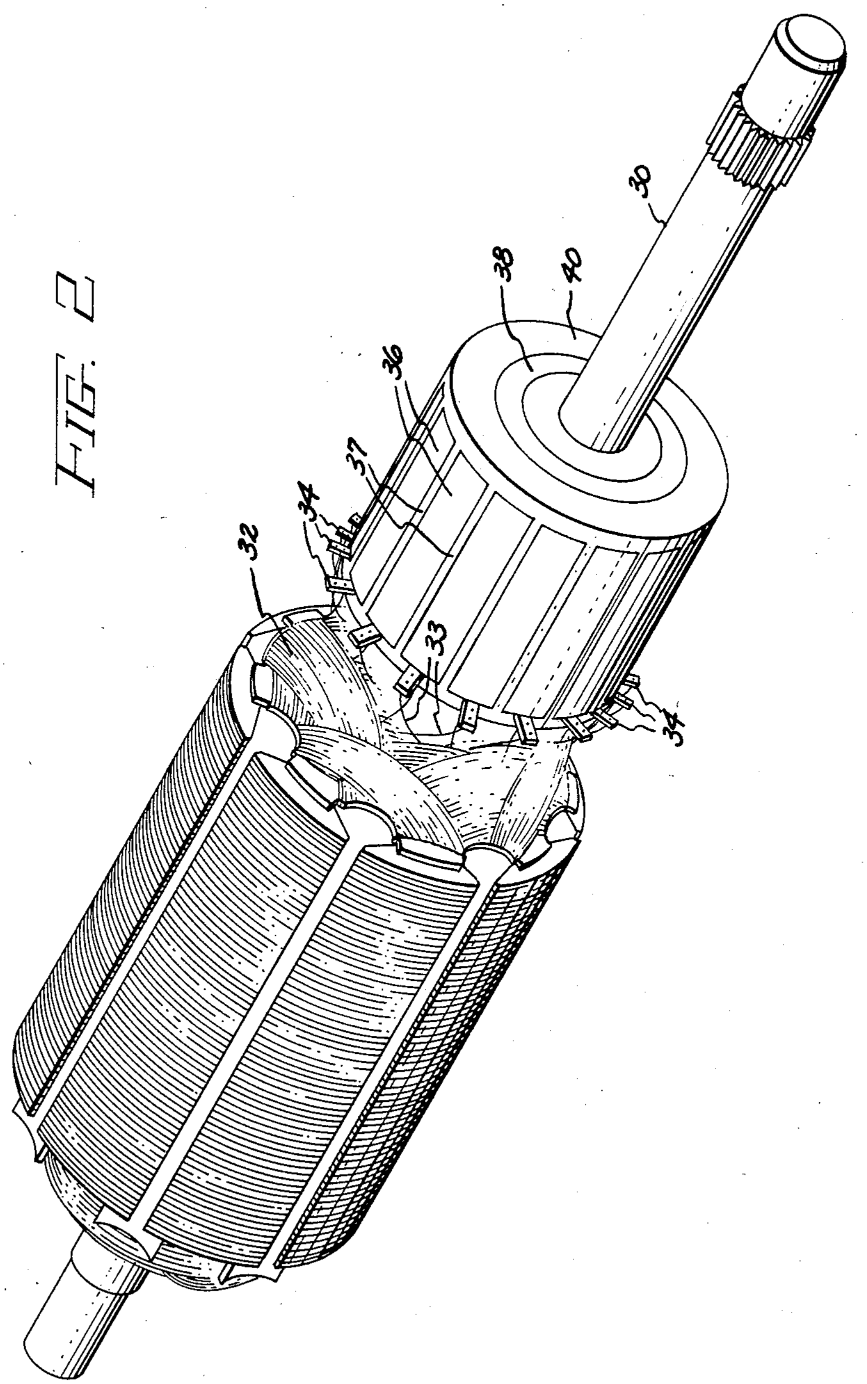
FIG. 2 is a perspective view of a commutator in accordance with one embodiment of the present invention, shown mounted on an armature shaft and connected to the armature windings.

FIG. 2 shows a commutator in accordance with one embodiment of the present invention in a typical configuration used in motors and generators, in which the commutator is mounted on armature shaft 30 and connected to armature windings 32 by means of conductors 33, such as wires, between windings 32 and risers 34 of commutator segments 36. Segments 36 form an annular segment pack in which the segments have inner and outer surfaces and are circumferentially arranged in a spaced-apart relationship about the axis of the armature so that the outer surfaces of the segments form an overall structure of cylindrical shape as the outer surface of the commutator. Separating segments 36 from each other are insulating gaps 37. The interior of the commutator includes annular core 38 to provide high strength at the inner radius of the commutator and to provide an effective anchoring means for the commutator segments. The spaces between the core and the segment pack and between individual segments are filled with molded matrix material 40, such as plastic having sufficient mechanical strength and dielectric properties. Also included in the commutator, but not visible in the view of FIG. 2, are means for mechanically interlocking each of the segments with the core.

Figure 3:
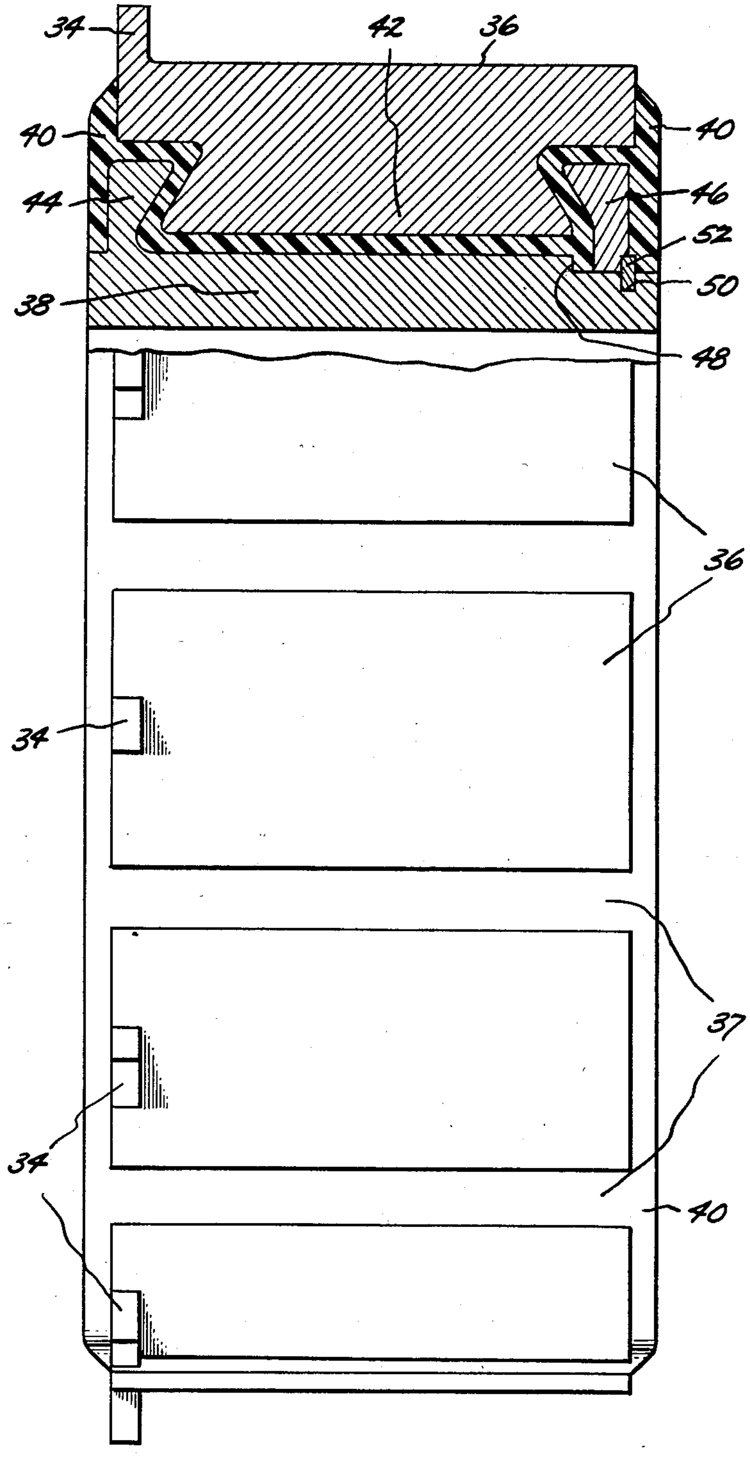
FIG. 3 is a side view in partial cross section of a commutator in accordance with one embodiment of the present invention.

A cross section of one embodiment of the means for mechanically interlocking the commutator segments with the core according to this invention is shown in the upper portion of FIG. 3. Each segment 36 has extending from its inner radius a segment tang 42 which forms an integral part of the segment. Each segment tang 42 extends toward the axis of the commutator and is shaped such that the axial width of the tang is greatest for a portion of the tang located at a radius between the innermost radius of the tang and the outermost radius thereof. Associated with segment tang 42 is a pair of core tangs 44 and 46 extending from the outermost radius of core 38, and located at opposite axial ends of segment tang 42. Core tangs 44 and 46 extend outwardly from core 38 and are shaped such that the axial width of each of them is greatest at a radius which is larger than the radius of the axially widest portion of the associated segment tang. Core tangs 44 and 46 are configured so that the axial distance between the axially widest portion of each of them is less than the axial width of the axially widest portion of associated segment tang 42, so as to define an interior channel between the core tangs and provide interlocking engagement between segment tang 42 and core tangs 44 and 46. The spaces between segment tang 42 and core tangs 44 and 46 are filled with nonconductive molded matrix 40, which insulates commutator segments 36 from core 38.

In the configurations embodied by the present invention for restraining the commutator against the effects of centrifugal forces, the commutator segments are firmly anchored to the commutator core. A positive, mechanically interlocking arrangement is provided which prevents loosening and the loss of commutator segments. Furthermore, in the anchoring system of the present invention, the major stresses in the nonconductive molded matrix are compression forces. In conventional molded commutators the major stresses in the molded matrix are tensile forces. The significance of this difference is that the plastic materials typically used as the molded matrix can withstand very high compression forces, but fail under relatively low tensile forces. As is illustrated in FIGS. 3–8, the molded matrix restrains the commutator segments from movement in both the axial and the radial directions, and holds the segments in position relative to the core. Thus, the molded matrix provides rigidity to the commutator structure.

In the embodiment in FIG. 3, core tang 44 is permanently affixed to core 38 and forms a part thereof. Core tang 46 is separate from core 38 and is attached thereto by means including circumferential groove 50 and split ring 52. In the embodiment shown, split ring 52 is engaged in groove 50 and restrains core tang 46 from movement in a direction toward the nearest axial end of the commutator. Shoulder 48 restrains core tang 46 from movement in the opposite axial direction. For the embodiment shown, assembly is accomplished by first positioning core tang 46 against shoulder 48 and fitting split ring 52 in groove 50. Core tang 46 is then repositioned against split ring 52 such that core tang 46 locks split ring 52 in groove 50. Molded matrix 40 completes the means for attaching core tang 46 to core 38.

Figure 4:
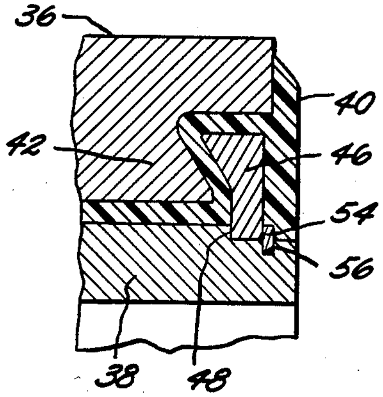
FIGS. 4, 5, 6, and 7 are partial side views in cross section of alternative embodiments of the means of mounting the core tang to the core in accordance with alternative embodiments of the present invention.
Figure 5:
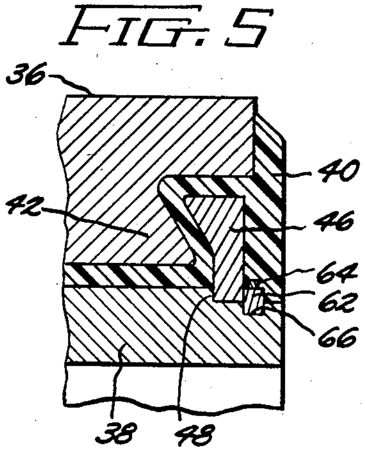
Figure 6:
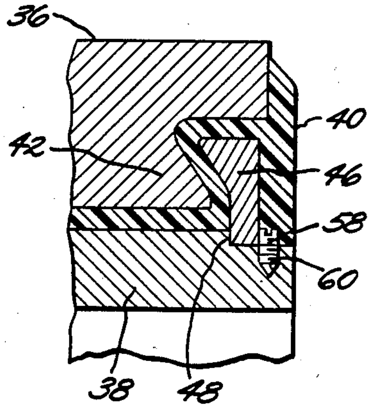
Figure 7:
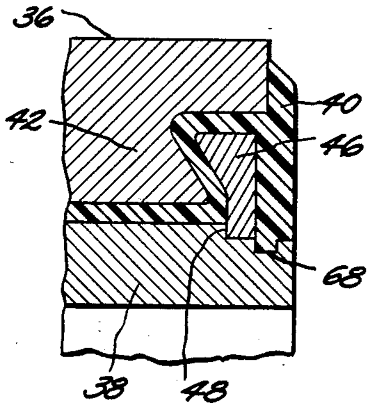

Referring now to FIGS. 4–7, alternative embodiments of the means for attaching core tang 46 to core 38 are shown. For all four embodiments, shoulder 48 and molded matrix 40 restrain core tang 46 in the same manner as for the embodiment shown in FIG. 3 and discussed above. However, for the embodiments shown in FIGS. 4–7, assembly is achieved by positioning core tang 46 against shoulder 48 and then restraining core tang 46 from movement in a direction toward the nearest axial end of the commutator by one of the means shown. It is not necessary for core tang 46 to have a recess for locking such a means in position. The embodiment shown in FIG. 4 uses snap ring 54 engaged in circumferential groove 56 to restrain core tang 46. A similar arrangement shown in FIG. 5 employs circular key 62 engaged in circumferential groove 66 and held in place by thin wire 64. An alternative arrangement is shown in FIG. 6 using set screw 58 engaged in associated recess 60. Still another embodiment shown in FIG. 7 uses circumferential groove 68 filled with molded matrix 40 as a means for restraining core tang 46. As is illustrated in FIGS. 4–7, for all of these embodiments, the groove in the outer surface of the core extends radially inwardly for a predetermined depth which is less than the radial thickness of the associated means employed to restrain the core tang from axial movement in a direction toward the nearest axial end of the core. For example, as shown in FIG. 4, the radial depth of groove 56 is less than the radial thickness of snap ring 54, so that snap ring 54 protrudes radially outwardly beyond the outer radius of core 38 at the location on the outer surface of core 38 where groove 56 is formed. In this manner, snap ring 54 and groove 56 restrain core tang 46 from axial movement in a direction away from segment tang 42. In a similar manner, as shown in FIG. 7, groove 68 having matrix 40 molded therein extends radially inwardly beyond the outer surface of core 38, so that groove 68 and matrix 40 provide a shear resistance force that restrains core tang 46 from axial movement toward the nearest axial end of core 38, away from segment tang 42.

Figure 8:
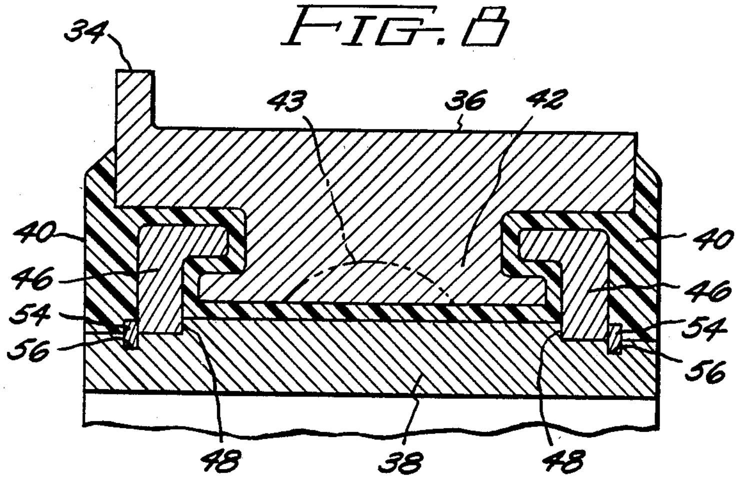
FIG. 8 is a partial side view in cross section of a commutator in accordance with an alternative embodiment of the present invention.

In an alternative embodiment shown in FIG. 8, another separate core tang 46 of the type shown in FIG. 4, along with similar means for attaching the core tang to the core, are used in place of fixed core tang 44. In still another embodiment of the present invention illustrated in FIG. 8, segment tang 42 is hollowed out and filled with nonconductive matrix 40, as shown by dotted line 43. Such an embodiment is useful for applications where the weight of the commutator segment is a concern. Furthermore, by reducing the weight of the commutator segment, the centrifugal force on the means for interlocking the commutator segment to the core produced by rotation of the commutator segment is reduced.

For all the embodiments of the present invention described above, core tangs 44 for all of the segments of the commutator may be formed as a continuous tang extending around the entire circumference of core 38. Similarly, core tangs 46 for all of the commutator segments may be formed as a continuous tang, in the shape of an annular ring. Core tangs 46 may also be formed as an annular assembly of individual core tangs.

Commutator segments 36 may be made from any suitable electrically conductive material. In a preferred embodiment, they are made from copper. Annular core 38 may be made from any high strength material. Preferably, core 38 comprises metal.

Nonconductive molded matrix 40 may be chosen from a variety of materials, such as plastic, phenolic, or ceramic. A material combining high dielectric strength with sufficient mechanical strength to prevent centrifugal disassembly of the commutator is preferred. If a molded matrix is not readily available to meet the dielectric and mechanical strength requirements for a particular application, two separate materials may be used in a two-step molding process in which a high dielectric strength matrix is first molded in the structure, followed by molding of a high mechanical strength matrix.

In practicing this invention, an annular segment pack is formed having a plurality of conductive segments 36 circumferentially arranged in a spaced-apart relationship about a central axis so that the outer surfaces of segments 36 form an overall structure of cylindrical shape as the outer surface of the commutator, as illustrated in FIG. 2. Each segment of the segment pack also has a tang extending from its inner radius for anchoring the segment against centrifugal disassembly, as illustrated in FIG. 3. An annular core is also formed having a first plurality of core tangs 44 circumferentially located on the outer surface of the core, in the manner shown in FIG. 3, for the purpose of interlocking engagement with the tangs on the conductive segments. During assembly the annular segment pack is fitted over the outside of the annular core such that the first plurality of core tangs 44 is in interlocking engagement with segment tangs 42. A second set of core tangs 46 is mounted on core 38 to complete the interlocking arrangement. Core tangs 44 for all of the segments of the commutator may be formed as a continuous tang extending around the entire circumference of core 38. Similarly core tangs 46 for all of the commutator segments may be formed as a continuous tang, in the shape of an annular ring. Core tangs 46 may also be formed as an annular assembly of the individual core tangs. Nonconductive matrix 40 is then molded between the segment pack and the core. For some applications, it may be desirable as a preliminary step to first install a high dielectric strength paste or matrix before the above molding step in order to ensure electrical isolation of the segments from one another and from the core.

The annular segment pack may be formed by any of the conventional manufacturing methods. One such method is to form individual conductive segments of the appropriate size and shape and then physically arrange the segments so that their outer surfaces are spaced apart and form a cylindrical shape. For such a method, insulating material is placed between the segments and the segments are held in place by some temporary means until assembly with the core and molding of the matrix is completed. Another method is to form all of the conductive segments together from a strip of conducting material which has been rolled into a cylindrical shape. For such a method, individual commutator segments are formed after assembly with the core and molding in of the matrix by removing the conductive material between the segments, using a sawing or slitting operation.

Figure 9:
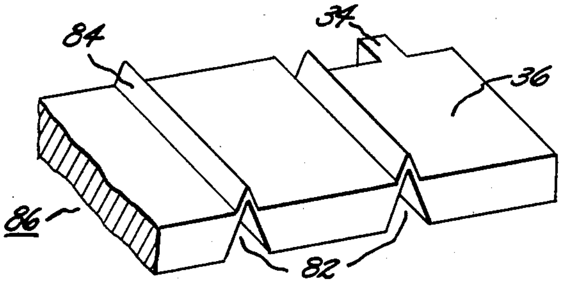
FIG. 9 is a perspective view of a strip of electrically conductive material during formation of the wedge-shaped cavities in accordance with one method embodied by the present invention.
Figure 10:
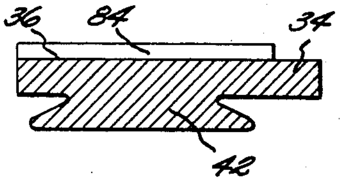
FIG. 10 is an end view in cross section of the strip of FIG. 9 after the formation of the segment tangs.

However, in a preferred embodiment of this invention, the annular segment pack is formed according to methods similar to those disclosed in U.S. patent application Ser. No. 334,351, filed Dec. 24, 1981, now abandoned, which is assigned to the same assignee as the present invention and incorporated herein by reference. As illustrated herein by FIG. 9, an annular segment pack may be formed in accordance with such methods by forming a plurality of wedge-shaped cavities 82 across one side of a thick strip of electrically conductive material 86, such as copper, from a roll of strip material (not shown), such that a plurality of parallel ridges 84 is formed on the opposite side of strip 86. Ridges 84 can be formed by, for example, stamping or rolling strip 86. The ridges are formed of material displaced above the plane of strip 86 by formation of wedge-shaped cavities 82. Ridges 84 are substantially parallel to each other and are equally spaced from one another a distance which corresponds to the circumferential width of segments 36. Each of the ridges is substantially orthogonal to the longitudinal direction of the strip and extends across the width thereof. The length of strip 86 is chosen such that the number of ridges formed corresponds to one less than the number of desired commutator segments. Strip 86 is further processed by forming riser 34 and segment tang 42 for each segment 36 by using appropriate machining operations. Risers 34 are formed at one edge of the strip. Segment tangs 42 are formed from the material located between wedge-shaped cavities. A cross sectional view of the end of thick strip 86 after the appropriate machining operations have been completed is shown in FIG. 10. Each segment 36 of the strip has a segment tang 42 and a riser 34. Between each of the segments is a ridge 84 on the side of the strip opposite where tangs 42 are located. These ridges serve to temporarily join the commutator segments and may be removed later by an appropriate machining operation.

In the embodiment shown, tang 42 is dove-tail shaped but other shapes which produce interlocking engagement are also possible. An alternative method for achieving the same result is to first form segment tangs 42 and risers 34 on thick strip 86 by appropriate machining operations, and then further process strip 86 to form wedge-shaped cavities 82 and resulting ridges 84. The machined strip is then rolled into a hollow annular shell with ridges 84 extending outward from the surface of the shell and tangs 42 extending inward. The two ends of the strip are spaced apart a distance equal to the width of the desired spacing between the commutator segments. If the strip of conducting material is of sufficient rigidity to retain its shape after being formed into an annular shell, no further processing is necessary and the annular segment pack is ready for assembly with the annular core. If the conductive material is not sufficiently rigid to retain its shape, the ends of the strip can be spot welded together.

Figure 11:
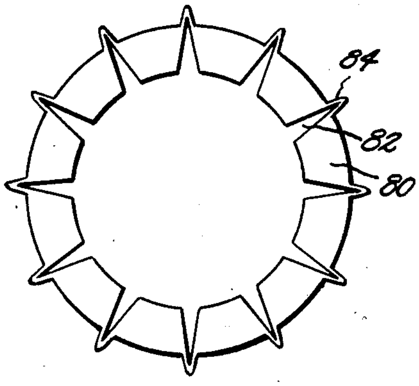
FIG. 11 is an end view of an annular segment pack after formation of the wedge-shaped cavities in the annular shell in accordance with an alternative method embodied by the present invention.
Figure 12:
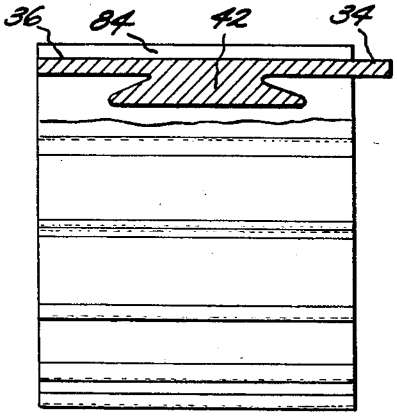
FIG. 12 is a partial end view in cross section of the annular segment pack of FIG. 11 after formation of the segment tangs.

For radially thick commutator segments, a preferred embodiment is illustrated in FIG. 11. The annular segment pack is manufactured by forming a plurality of wedge-shaped cavities 82 on the inner surface of an annular shaped shell of electrically conductive material 80, such that a plurality of parallel ridges 84 is formed on the outer surface of shell 80, as described below. Ridges 84 all extend from one axial end of shell 80 to the other axial end thereof, and are all parallel to the central axis of shell 80 and to each other. The ridges are radially located such that they are equally spaced from one another a distance corresponding to the circumferential width of the commutator segments. Ridges 84 are formed of material displaced beyond the outer surface of shell 80 by an appropriate machining operation. In one embodiment of the present invention, wedge-shaped cavities 82 and corresponding ridges 84 are formed by an extrusion operation. The number of ridges formed corresponds to the number of desired commutator segments. Shell 80 is further processed by appropriate machining operations to form riser 34 and segment tang 42 for each commutator segment. Each riser 34 is formed at the same axial end of shell 80. Each tang 42 is located at the inner radius of shell 80 and is formed from the material located between wedge-shaped cavities 82. A cross sectional view of shell 80 after completion of the appropriate machining operations is shown in FIG. 12. Each resulting commutator segment 36 has a riser 34 and a segment tang 42. Between each pair of adjacent segments 36 is a ridge 84 which extends outward from the outer surface of shell 80 and which serves to temporarily join the segments.

For either of the two preceding preferred methods of forming an annular segment pack, the nonconductive matrix used for the molding process fills the wedge-shaped cavities between the segments during the molding step. After the molding step, the ridges are removed to form separate commutator segments by machining the other surface of the commutator. For efficiency, the machining operation used to true the commutator can be employed to remove the ridges. The insulating material that is left between the commutator segments after the ridges have been removed helps to insulate the segments from one another. If the nonconductive matrix used for the molding step does not possess sufficient dielectric strength for a particular application, an insulating paste may be installed in the wedge-shaped cavities before the molding step. Another possibility is to first mold in a matrix of high dielectric strength, and then mold in a matrix of high mechanical strength. The width of the wedge-shaped cavities is chosen such that the space between the commutator segments resulting from the machining operation is equal to the desired gap between commutator segments.

For either of the two preceding preferred methods of forming an annular segment pack, wedge-shaped cavities 82 may also be formed by broaching. However, if a broaching operation is used, ridges 84 will not be formed. To make separate commutator segments from an annular segment pack that has been formed using a broaching operation, a machining operation such as turning is used after the molding step to remove enough of the outer surface of the commutator segments to remove the electrically conductive material between the tips of wedge-shaped cavities 82 and the outer surface of the commutator.

The foregoing describes a commutator structure which provides an effective anchoring means for the commutator segments to prevent centrifugal disassembly of the commutator during operation. The commutator described has sufficient strength for use in applications requiring large commutator diameters, while also being economical to manufacture with existing technology. The methods described for manufacturing such commutators are not labor intensive and can easily be automated.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A commutator for rotating electrical machinery comprising:

an annular segment pack including a plurality of conductive segments having inner and outer surfaces, said segments being circumferentially arranged in a spaced-apart relationship about an axis so that their outer surfaces form an overall structure of cylindrical shape as the outer surface of the commutator, each said segment having a segment tang extending radially from the inner radius of said segment toward said axis, said segment tang being axially located intermediate the axial ends of said segment and extending axially for a substantial portion of the axial length of said segment, with said segment tang forming an integral part of said segment and being shaped so that the axial width of said segment tang is greatest at a radius located between the innermost radius of said segment tang and the outermost radius thereof;

an annular core located inside said annular segment pack;

means for mechanically interlocking each of said segments tangs with said core with the radially inner surfaces of said segments being spaced apart from the radially outer surface of said annular core; said interlocking means comprising a pair of core tangs associated with each said segment gang, with said core tangs being located at opposite axial ends of said segment tang, said core tangs extending radially from the outermost radius of said core toward said conductive segments and being shaped such that the axial width of each of said core tangs is greatest at a radius which is larger than the radius of the axially widest portion of said segment tang, and each pair of said core tangs being configured so that the axial distance between said core tangs at their axially widest portions is less than the width of the widest portion of the associated segment tang, so as to provide interlocking engagement between said segment tang and said core tangs, and means for attaching said core tangs to said core comprising a shoulder formed in said core for axially positioning at least one of said core tangs on said core and for restraining said core tang from axial movement in a direction toward the axial center of said core and means for restraining said core tangs from axial movement in a direction toward the axial end of said core, said means for restraining said core tang comprising a split ring and a circumferential groove in said core for engagement with said split ring.

2. A commutator for rotating electrical machinery comprising:

an annular segment pack including a plurality of conductive segments having inner and outer surfaces, said segments being circumferentially arranged in a spaced-apart relationship about an axis so that their outer surfaces form an overall structure of cylindrical shape as the outer surface of the commutator, each said segment having a segment tang extending radially from the inner radius of said segment toward said axis, said segment tang being axially located intermediate the axial ends of said segment and extending axially for a substantial portion of the axial length of said segment, with said segment tang forming an integral part of said segment and being shaped so that the axial width of said segment tang is greatest at a radius located between the innermost radius of said segment tang and the outermost radius thereof;

an annular core located inside said annular segment pack;

means for mechanically interlocking each of said segments tangs with said core with the radially inner surfaces of said segments being spaced apart from the radially outer surface of said annular core; said interlocking means comprising a pair of core tangs associated with each said segment tang, with said core tangs being located at opposite axial ends of said segment tang, said core tangs extending radially from the outermost radius of said core toward said conductive segments and being shaped such that the axial width of each of said core tangs is greatest at a radius which is larger than the radius of the axially widest portion of said segment tang, and each pair of said core tangs being configured so that the axial distance between said core tangs at their axially widest portions is less than the width of the widest portion of the associated segment tang, so as to provide interlocking engagement between said segment tang and said core tangs, and means for attaching said core tangs to said core comprising a shoulder formed in said core for axially positioning at least one of said core tangs on said core and for restraining said core tang from axial movement in a direction toward the axial center of said core and means for restraining said core tangs from axial movement in a direction toward the axial end of said core, said means for restraining said core tang comprising a snap ring and a circumferential groove in said core for engagement with said snap ring.

3. A commutator for rotating electrical machinery comprising:

an annular segment pack including a plurality of conductive segments having inner and outer surfaces, said segments being circumferentially arranged in a spaced-apart relationship about an axis so that their outer surfaces form an overall structure of cylindrical shape as the outer surface of the commutator, each said segment having a segment tang extending radially from the inner radius of said segment toward said axis, said segment tang being axially located intermediate the axial ends of said segment and extending axially for a substantial portion of the axial length of said segment, with said segment tang forming an integral part of said segment and being shaped so that the axial width of said segment tang is greatest at a radius located between the innermost radius of said segment tang and the outermost radius thereof;

an annular core located inside said annular segment pack;

means for mechanically interlocking each of said segments tangs with said core with the radially inner surfaces of said segments being spaced apart from the radially outer surface of said annular core; said interlocking means comprising a pair of core tangs associated with each said segment gang, with said core tangs being located at opposite axial ends of said segment tang, said core tangs extending radially from the outermost radius of said core toward said conductive segments and being shaped such that the axial width of each of said core tangs is greatest at a radius which is larger than the radius of the axially widest portion of said segment tang, and each pair of said core tangs being configured so that the axial distance between said core tangs at their axially widest portions is less than the width of the widest portion of the associated segment tang, so as to provide interlocking engagement between said segment tang and said core tangs, and means for attaching said core tangs to said core a shoulder formed in said core for axially positioning at least one of said core tangs on said core and for restraining said core tang from axial movement in a direction toward the axial end of said core, and means for restraining said core tangs from axial movement in a direction toward the nearest axial end of said core said means for restraining said core tang comprising a circular key held in place by a wire and a circumferential groove in said core, for engagement with said circular key.

* * * * *

UNITED STATES PATENT AND TRADEMARK OFFICE
CERTIFICATE OF CORRECTION

PATENT NO. : 4,559,464

DATED : December 17, 1985

INVENTOR(S) : Vijay K. Stokes

It is certified that error appears in the above-identified patent and that said Letters Patent are hereby corrected as shown below:

Column 8, line 62, delete "gang" and substitute --tang--.

Column 10, line 36, delete "gang" and substitute --tang--.

Column 10, line 50, after "core" (second occurrence) insert --comprising--.

Column 10, line 54, delete "end" and substitute --center--.

Column 10, line 57, after "core" (first occurrence) insert a comma --,--.

Signed and Sealed this

Twenty-eighth Day of October, 1986

[SEAL]

*Attest:*

DONALD J. QUIGG

*Attesting Officer* *Commissioner of Patents and Trademarks*